Nov. 3, 1953 F. KESSLER 2,658,109

AUTOMATIC TELEPHONE SYSTEM

Filed Dec. 31, 1949 3 Sheets-Sheet 1

INVENTOR.
FRANK KESSLER
BY T. L. Bowes
ATTORNEY

INVENTOR.
FRANK KESSLER
BY T. L. Bowes
ATTORNEY

INVENTOR.
FRANK KESSLER
BY
T. L. Bowes
ATTORNEY

Patented Nov. 3, 1953

2,658,109

UNITED STATES PATENT OFFICE 2,658,109

AUTOMATIC TELEPHONE SYSTEM

Frank Kessler, Rochester, N. Y., assignor to Stromberg-Carlson Company, a corporation of New York Application December 31, 1949, Serial No. 136,339

6 Claims. (Cl. 179—18)

Figure 1:
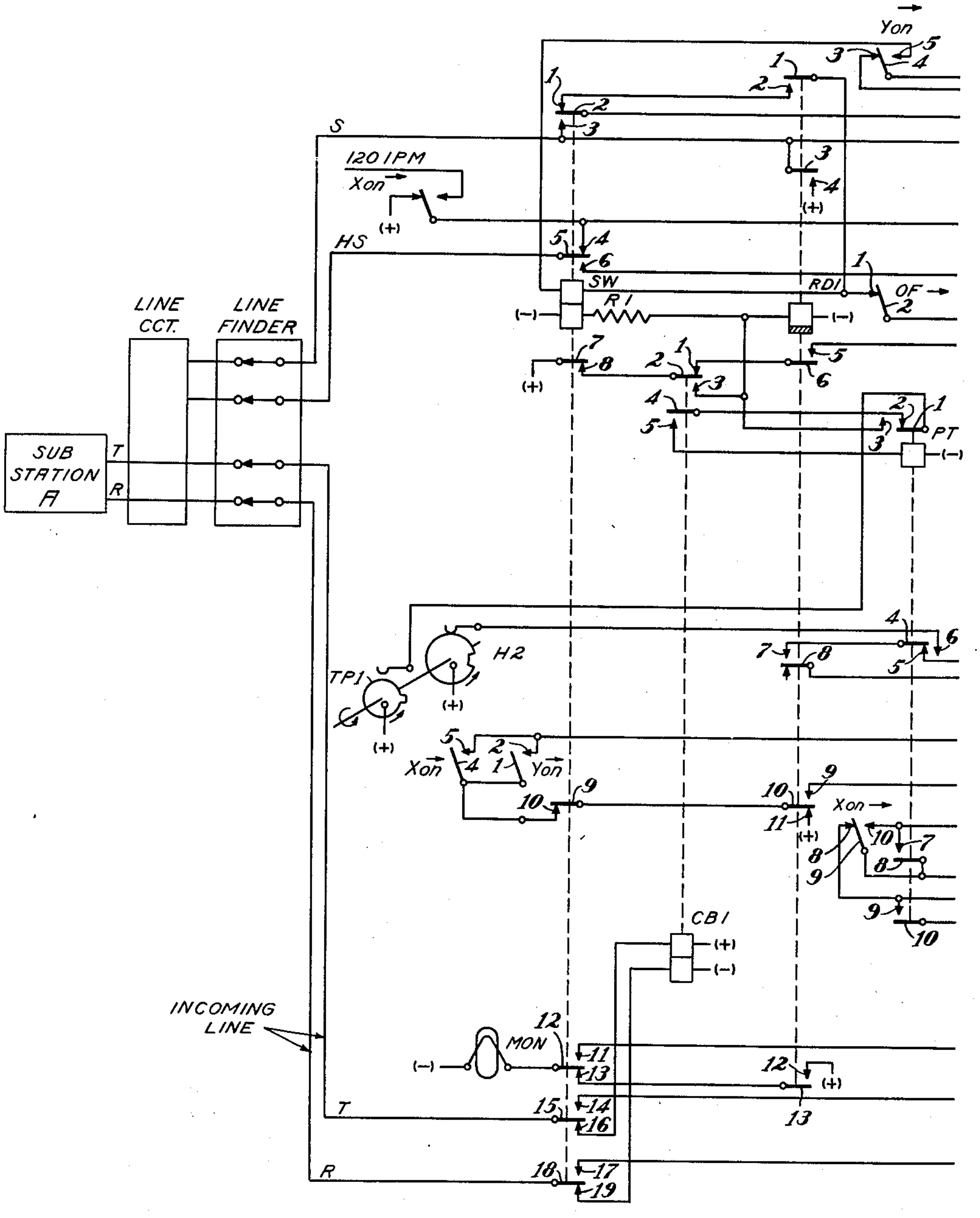

My invention relates to automatic telephone systems, and particularly to automatic telephone systems having automatic switching means for dealing with an incoming line on which a call has been initiated, but from which no impulses have been received.

In automatic telephone systems, calls are normally initiated at a subscriber's substation by the subscriber's act of removing the receiver (or handset) from the switch hook. The subscriber ordinarily proceeds to select the substation he desires by operating his impulse sending means, usually a dial, in a prescribed manner. The impulse sending means transmits impulses to automatic switching means at a central exchange. This switching means performs the mechanical function of connecting the incoming line from the calling substation to an outgoing line leading to the desired substation.

It sometimes occurs that a call is initiated at a substation, but no impulses are received by the automatic switching means. Such a condition is sometimes referred to as a "permanent." This may happen, for example, if a subscriber accidentally knocks his receiver or handset off its hook, without any intention of making a telephone call. In such cases it is desirable to inform the subscriber that his receiver is off the hook, since under these conditions he cannot receive incoming calls, and a certain amount of apparatus at the central exchange is kept from the use of other subscribers.

Prior to my invention, it was customary for a trouble man to observe the performance of the automatic switching apparatus. When he noticed that a particular piece of apparatus, such as a selector, had been seized but no impulses had been received over the incoming line, he would inform the wire chief of the fact. The wire chief then "challenged" the line in question; that is, he ascertained whether anyone at the substation was still on the incoming line. If so, he requested the person to hang up; if not, he connected a "howler" to the incoming line. The howler voltage would cause the receiver at the substation to produce a loud noise, and so induce anyone within hearing distance at the substation to hang up the receiver. This procedure was slow and required the presence of two men. Furthermore, the trouble man might be busy with other duties and not notice that an incoming line was tied up.

It is therefore an object of my invention to provide, in an automatic telephone system new and improved means for returning to service, after a predetermined interval of time, automatic switching apparatus which has been seized by an incoming line but which is not engaged in a connection with an outgoing line.

It is also an object of my invention to provide, in an automatic telephone system, means for indicating to an operator at a manual switchboard that automatic switching apparatus has been seized by an incoming line but that no impulses have been received over that incoming line.

It is a further object of my invention to provide, in an automatic telephone system, switching means automatically operative to connect an incoming line, on which a call has been initiated and over which impulses have been received, to an outgoing line, but automatically operative, if a call is initiated on an incoming line but no impulses are received within a predetermined interval of time, to connect the incoming line to a manual switchboard.

In general, I accomplish these and other objects of my invention by arranging automatic switching apparatus, such as a selector of a step-by-step telephone system, to cooperate with timing means for measuring a predetermined interval of time. I arrange the automatic switching apparatus to connect an incoming line to an outgoing line responsive to initiation of a call on the incoming line and the receipt of impulses from that incoming line, and I further arrange the timing means to cause the automatic switching apparatus to connect the incoming line to a manual switchboard if a call is initiated on the incoming line but no impulses are received over that incoming line within a predetermined interval of time.

In the preferred embodiment of my invention explained herein, I accomplish the foregoing and other objects of my invention by arranging a step-by-step selector to step in both primary and secondary coordinate directions responsive to impulses received over an incoming line in a normal call, but to step automatically only in the secondary coordinate direction if no impulses are received over the incoming line within a predetermined interval of time, as measured by a timing means. By this stepping in the secondary coordinate direction, I provide a means for the incoming line to be connected to a manual switchboard. I also arrange for the actuation of a signal device at the switchboard, whereby the operator thereat is informed that an intercepted call is present on that particular incoming line.

When my invention is applied to a step-by-step automatic telephone system, I prefer to employ an impulse-responsive switch of the flat two direction type. Such a switch may be adapted to step its wipers in two coordinate directions oriented at right angles to each other, a primary coordinate direction and a secondary coordinate direction. However, I wish it to be expressly understood that my invention is applicable to impulse-responsive switches of the Strowger, three-dimensional or other types.

Further objects and advantages of my invention will become apparent as the following description proceeds, and the features of novelty which characterize my invention will be pointed out with particularity in the claims annexed to and forming a part of this specification.

Figure 2:
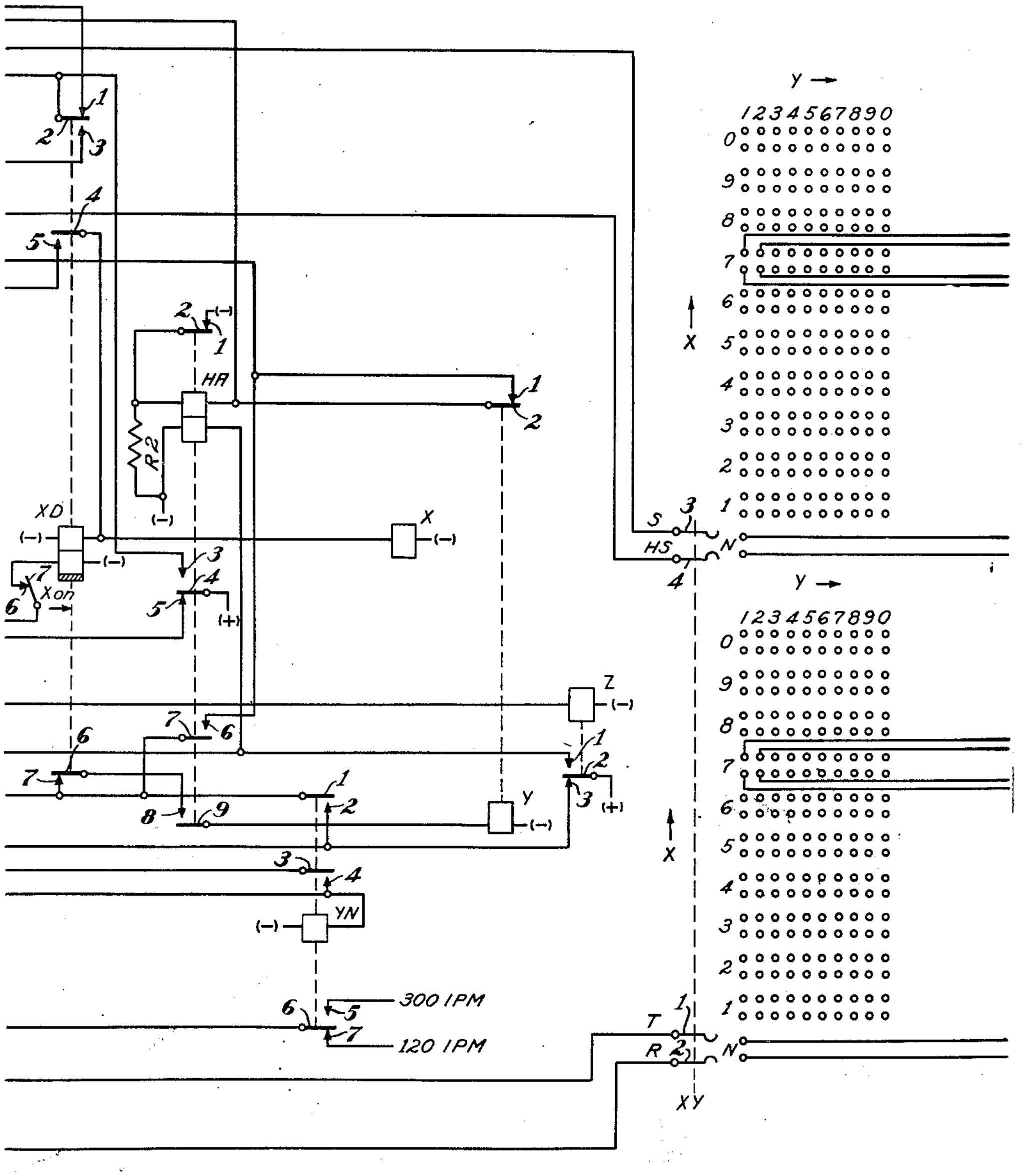
Figure 3:
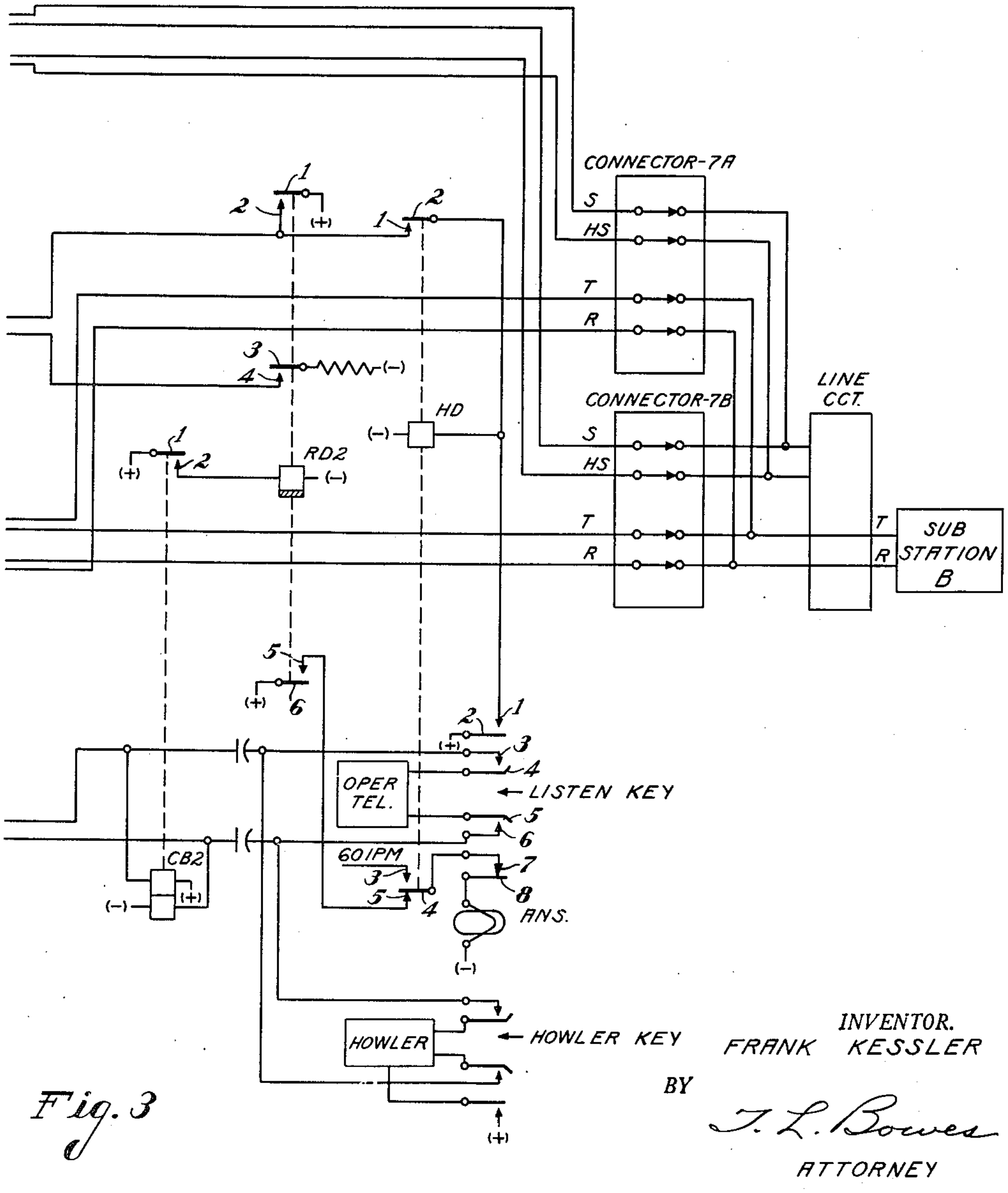

For a better understanding of my invention, reference may be had to the accompanying drawing, in which Figures 1, 2 and 3, when laid in numerical order from left to right with corresponding lines in alignment, show a preferred embodiment of my invention.

Specifically, Fig. 1 shows a substation A, a line circuit and a line finder in block form, together with a schematic representation of part of an impulse-responsive selector circuit embodying my invention;

Fig. 2 shows a schematic diagram of the remaining part of the selector circuit shown in Fig. 1; and Fig. 3 shows a schematic diagram of a line circuit suitable for use at a manual switchboard in conjunction with the selector shown in Figs. 1 and 2. Fig. 3 also shows, in block form, connectors, a line circuit and a subscriber's substation.

In those parts of the drawings showing the specific wiring arrangements of my invention, conventional schematic representations have been made in the interests of ready comprehension. Specifically, contacts are indicated as belonging to a given relay by a vertical dashed line drawn through them and the winding of that relay.

The facts that the wipers of the switch move together is also indicated by a vertical dashed line labelled "XY." The switch is provided with contact springs known as "off-normal" springs. Some of these, indicated as "$X_{on}$" herein, are operated when the wipers move away from their "normal" or home position in the first, or X coordinate direction; others, indicated as "$Y_{on}$," are operated when the wipers move away from their normal position in the second, or Y, coordinate direction. The direction of movement away from normal is indicated in the drawing by a small arrow.

*Operation on normal call*

The operation of the preferred embodiment of my invention will first be explained in conjunction with a normal call, that is, one in which initiation is followed within a reasonable time by the dialling of impulses.

Fig. 1 shows that when a subscriber at substation A removes his receiver or handset from the switch hook, a loop circuit is closed over the incoming line for the operation of relay CB1. This circuit extends from (+), upper winding of relay CB1, contact SW–16 and armature SW–15 of switch through relay SW, tip conductor T extending through the line finder and line circuit to substation A, ring conductor back from substation A line through the line circuit and line finder to armature SW–18, contact SW–19, lower winding of CB1 to (−).

Relay CB1 closes a circuit for energizing slow-to-release delay relay RD1 and for priming the lower winding of relay SW, thereby rendering the latter relay quick to operate. This circuit extends from (+), armature SW–7, contact SW–8, armature CB1–2, contact CB1–3, winding of RD1 to (−); the priming circuit for relay SW extends over the path outlined to contact CB1–3, from which it passes through resistor R1 and lower winding of SW to (−). Relay CB1 also prepares a path for the operation of relay PT, this path extending from the cam spring for timing cam TP1 through armature PT1, contact PT2, armature CB1–4, contact CB1–5, and the winding of PT to (−).

Upon operation, relay RD1 grounds the back sleeve lead S at its contact RD1–4 and armature RD1–3. Relay RD1 also closes a circuit for energizing the lower winding of relay XD, this path extending from (+), armature HA–4, contact HA–5, armature RD1–8, contact RD1–7, armature PT–4, contact PT–5, $X_{on}$ springs 6 and 7, lower winding of XD to (−). Relay RD1 also closes a circuit for lighting the monitor lamp MON, this circuit extending from (+), contact RD1–12, armature RD1–13, contact SW–13, armature SW–12, lamp MON to (−).

The foregoing sequence of events is normally followed by the receipt of impulses from substation A. These impulses comprise interruptions of the loop circuit caused by an impulse sending means such as a dial, at substation A. At the beginning of the first loop interruption, the above traced energizing circuit for relay CB1 is broken. Relay CB1 therefore releases and breaks, at its armature CB1–2 and contact CB1–3, the previously traced operating circuit for relay RD1 and priming circuit for the lower winding of relay SW. Relay RD1 does not fall back, however, because of its slow release characteristics. Relay CB1 also opens, at its armature CB1–4 and its contact CB1–5, the previously prepared operating circuit from the TP1 lead to relay PT.

Relay CB1 also closes an energizing path for the upper winding of relay XD and stepping relay X, this circuit extending from (+), armature SW–7, contact SW–8, armature CB1–2, contact CB1–1, armature RD1–6, contact RD1–5, previously operated contact XD–5 and armature XD–4, upper winding of XD to (−), the upper winding of relay XD being in parallel with stepping magnet X. Energization of stepping magnet X causes the wipers XY–1, XY–2, XY–3 and XY–4 each to take one step in the first (X) coordinate direction.

As a result of the movement of the wipers away from their normal position, opposite to (but not engaged with) the contacts in the normal or N level in the switch banks, the $X_{on}$ springs are operated. $X_{on}$ springs 6 and 7 consequently opon the previously traced energizing circuit for the lower winding of relay XD while $X_{on}$ springs 8 and 9 break a point in a possible operating circuit for relay YN. $X_{on}$ springs 4 and 5 prepare an operating circuit for the release magnet Z of the XY switch.

At the end of the first impulse, the loop circuit including the incoming line is re-closed at substation A, thus re-operating relay CB1. This opens, at armature CB1–2 and contact CB1–1, the previously-traced operating circuit for magnet X. Relay XD remains operated at this time because of its slow-release characteristics.

The alternate release and re-operation of relay X occurs for each impulse transmitted from the impulse-sending means at substation A over the incoming line, because this results in the alternate release and re-operation of relay CB1. After the end of the last impulse transmitted, relay XD releases.

The release of relay XD results in the energization of the upper winding of HA, the circuit extending from (+), contact RD1-4, armature RD1-3, armature XD-2, contact XD-1, $Y_{on}$ springs 4 and 3, upper winding of HA, armature HA-2, contact HA-1 to (−). Upon operation, relay HA breaks this circuit at its armature 2, but a holding circuit through resistor R2 is present. The lowered current flow through the upper winding of HA and RT in series makes HA quick to release. Relay HA also completes a path for the operation of switch magnet Y, the circuit extending from (+), armature Z-2, contact Z-3, $X_{on}$ springs 9 and 10, contact XD-7 and armature XD-6, contact HA-8, armature HA-9, winding of magnet Y to (−). At its armature HA-4 and contact HA-3, relay HA places (+) on the back sleeve S to mark this selector as busy.

Upon energization, magnet Y causes the wipers of the switch to take one step in the Y coordinate direction, thus engaging them with the first set of contacts in the level at which the switch was previously set as the result of stepping in the X coordinate direction. As the result of making the first step in the Y direction, $Y_{on}$ springs 3 and 4 are disengaged. This opens a point in the previously-traced energizing circuit for the upper winding of relay HA. Relay HA consequently releases and opens the energizing circuit for magnet Y at contact HA-8 and armature HA-9. The release of magnet Y is therefore effective to close a new energizing circuit for the upper winding of relay HA. This circuit extends from (+) on the switch front sleeve contact, armature SW-2, contact SW-1, contact RD1-2, armature RD1-1, overflow springs 1 and 2 of the switch, contact Y-1, armature Y-2, upper winding of HA, armature HA-2 and contact HA-1 to (−). As before, relay HA opens its armature HA-2 to establish its holding circuit through resistor R2.

Relay HA now re-closes, at its armature HA-9 and contact HA-8, the operating circuit for magnet Y. Magnet Y thus causes the switch wipers to take a second step, and to open, at armature Y-2 and contact Y-1, the new operating circuit for relay HA. Relay HA consequently falls back and opens the circuit for magnet Y at contact HA-8 and armature HA-9.

If the second line in the selected level is busy, ground on the sleeve contact will cause the above enumerated sequence of events to repeat and to advance the switch farther in the Y coordinate direction, until an idle line is found.

Whenever an idle line is found, whether it be the first line in the level or a subsequent line, the fact will be indicated by the absence of ground on the sleeve contact of that particular line. As a result, the circuit of the Y magnet will not be completed, nor will the circuit for relay HA. It will be noted that, when a busy line is found, the busy identifying sleeve ground extends by way of armature SW-2, contact SW-1, contact RD-2, and armature RD-1 to one side of the operating winding of relay SW thus shunting the relay and preventing its operation since ground also appears on the other side of the winding of relay SW as extending from contact RD-4, armature RD-3, armature XD-2, contact XD-1, and off-normal spring contacts 4 and 5. When an idle line is found and no ground appears at the sleeve contact, the SW relay operates in series with the HA relay which, however, does not operate as the SW relay operating winding is of much higher resistance than the HA relay winding. This circuit may be traced as follows: ground through contact RD-4, armature RD-3, armature XD-2, contact XD-1, off-normal spring contacts 4 and 5, operating winding of SW, overflow spring contacts 1, 2, Y magnet interrupter contacts 1, 2, HA relay winding, armature HA-2, and contact HA-1 to battery.

At its armatures SW-15 and SW-18, relay SW transfers the tip and ring conductors of the incoming line from relay CB1 to the tip and ring brushes of the XY switch. This action releases relay CB1 and causes seizure of the connector connected to the contacts of the XY switch by means of the outgoing line. Upon seizure, the connector causes the front sleeve contact to become (+). Relay SW now locks over a circuit extending from (+), the sleeve contact of the selected outgoing line in the banks of the switch, brush 3, armature SW-2, contact SW-3, back sleeve conductor S, armature XD-2, contact XD-1, $Y_{on}$ springs 4 and 5, upper winding of relay SW, overflow springs 1 and 2, contact Y-1, armature Y-2, upper winding of relay HA, armature HA-2, contact HA-1 to (−). Although relay HA is in series with relay SW, relay HA is not operated because it has a much lower resistance than relay SW.

The release of relay CB1 opens, at contact CB1-3 and armature CB1-2, the energizing circuit for the lower winding of relay SW and the winding of relay RD1. Because of its slow release characteristics, relay RD1 drops back after a delay, rather than instantaneously. It will be noted that relay SW connects the front to the back sleeve lead at armature SW-2 and contact SW-3. The circuit is consequently still marked as busy by ground on the back sleeve lead S when relay RD1 releases armature RD1-3.

The operation of relay SW causes lamp MON to be flashed at a distinctive rate, such as 120 times per minute, instead of being steadily lighted, as it was previously. The circuit for accomplishing this may be traced from the lead marked 120 IPM (120 impulses per minute, which may be supplied from an interrupter circuit, such as is commonly found in telephone exchanges), contact YN-7, armature YN-6, contact SW-11, armature SW-12, lamp MON to (−). This 120 IPM "Busy flash" indicates that the selector circuit is engaged in a normal call.

If the calling or called party hangs up, ground is removed from the front sleeve of the selector by mechanism within the connector circuit. Since this front sleeve ground is part of the holding circuit for relay SW, relay SW falls back and re-closes the circuit (including the incoming-line loop circuit) for re-operating relay CB1. The re-operation of relay CB1 re-closes the circuit for relay RD1. A circuit for lamp MON is now completed from (+), contact RD1-12, armature RD1-13, contact SW-13, armature SW-12, lamp MON to (−), and lamp MON is consequently steadily illuminated.

The release of relay SW also prepares a circuit for the energization of the release magnet Z of the switch when the calling party hangs up. When the latter event happens, the loop circuit for energizing relay CB1 is broken at substation A. Relay CB1 therefore releases and opens the energizing circuit for relay RD1 at its contact CB1-3. When relay RD1 falls back a short time later, it completes a circuit for release magnet Z which extends from (+), contact RD1-11, armature RD1-10, armature SW-9, contact SW-10, $X_{on}$ springs 4 and 5 (having $Y_{on}$ springs 1 and 2 in parallel), winding of magnet Z to (−). The release of relay RD1 also opens the operating circuit for lamp MON. Magnet Z releases the wipers of the switch, and they return to their normal or home position. The energizing circuit for magnet Z is broken at both $X_{on}$ spring 4 and $Y_{on}$ spring 1 when the wipers reach the normal position.

During its energization, magnet Z causes the energization of lower winding of relay HA over a circuit extending from (+), armature Z-2, contact Z-1, lower winding of relay HA to (−). Relay HA then operates to place ground (through its armature HA-4 and contact HA-3) on the back sleeve lead S. This insures that the selector will not be seized until the Z magnet is finally released.

If the calling party hangs up first, the battery feed relay in the connector circuit will be released, causing the ground to be removed from the front sleeve contact of the selector. This will cause release of the selector in the manner as first described.

*Operation when no impulses are received*

As previously explained, closure of the incoming line loop at substation A causes the operation of relay CB1, which in turn operates relay RD1, prepares at its contacts 4 and 5, a path for the operation of relay PT from interrupter cam TP-1 and closes the priming circuit for relay SW. Relay RD1 grounds the back sleeve at contacts RD1-3 and RD1-4, and energizes the lower winding of relay XD. The latter circuit extends from (+), armature HA-4, contact HA-5, armature RD1-8, contact RD1-7, armature PT-4, contact PT-5, $X_{on}$ springs 6 and 7, lower winding of XD to (−). Relay RD1 also causes the steady illumination of lamp MON over a circuit extending from (+), contact RD1-12, armature RD1-13, contact SW-13, armature SW-12, lamp MON to (−).

If no impulses are received over the incoming line from the impulse sending means at substation A, interrupter cam TP1 eventually engages its contact spring to send a pulse of ground to relay PT. This circuit may be traced from (+), interrupter cam TP1, cam spring for TP1, armature PT-1, contact PT-2, armature CB1-4, contact CB1-5, winding of relay PT to (−).

The operation of relay PT causes the holding ground for the lower winding of relay XD to be transferred from (+) at armature HA-4 to (+) from the H2 interrupter cam. This circuit may be traced from (+), interrupter cam H2, cam spring for H2, contact PT-6, contact PT-5, $X_{on}$ springs 7 and 6, lower winding of relay XD to (−). Relay PT also completes a path for energizing relay YN; this circuit may be traced from (+), armature Z-2, contact Z-3, $X_{on}$ springs 9 and 8, contact PT-9, armature PT-10, winding of relay YN to (−). Relay YN locks to ground over this path because its contact YN-4 and armature YN-3 are in parallel with armature PT-10 and contact PT-9. Relay YN prepares a path for placing 300 ground impulses per minute on lamp Mon. These pulses may be obtained over the 300 IPM lead from some source such as a suitable cam on the exchange interrupter, for example.

Inasmuch as interrupter cams TP1 and H2 are keyed to the rotating shaft of the interrupter in the position indicated in Fig. 1, the holding of the lower winding of relay XD continues until cam H2 has made almost a complete revolution, that is, until the recess in the cam is at a position where its cam spring is disengaged. (If dial pulses should be received before this time, relay PT will be released because relay CB1 is interrupted at the beginning of the first impulse and opens the energizing circuit for relay PT at armature CB1-4. This restores the circuit to the condition that it would be in if relay PT were not energized, as in a normal call.)

A short time after ground is removed at cam H2, relay XD falls back to complete a circuit for energizing the upper winding of relay HA. This circuit may be traced from (+), contact RD1-4, armature RD1-3, armature XD-2, contact XD-1, $Y_{on}$ springs 4 and 3, upper winding of HA, armature HA-2, contact HA-1 to (−). Relay HA opens its armature HA-2 to insert resistor R2 in series with its winding and thus make itself quick-to-release. Relay HA now locks up over a circuit extending from (+), armature HA-4, contact HA-3, armature XD-2, contact XD-1, $Y_{on}$ springs 4 and 3, upper winding of relay HA, resistor R2 to (−). Relay HA also closes an operating circuit for the Y magnet, this circuit extending from (+), armature HA-4, contact HA-3, armature XD-2, contact XD-1, $Y_{on}$ springs 4 and 3, armature Y-2, contact Y-1, contact HA-6, armature HA-7, contact XD-7, armature XD-6, contact HA-8, armature HA-9, winding of magnet Y to (−).

As a result of its energization, the Y magnet steps the wipers of the switch one step in the secondary (Y) coordinate direction, thus engaging the wipers with the first contacts in the normal level N. When the wipers move off normal, the $Y_{on}$ contacts are operated. This breaks the above-described locking circuit for relay HA at $Y_{on}$ springs 4 and 3, and relay HA falls back.

When relay HA releases, the operating circuit for magnet Y is broken at armature HA-9 and contact HA-8. The Y magnet consequently drops back. The $Y_{on}$ springs actuated by the single step in the Y direction have, however, completed a circuit for energizing the upper winding of relay SW which extends from (+), contact RD1-4, armature RD1-3, armature XD-2, contact XD-1, $Y_{on}$ springs 4 and 5, upper winding of SW, XY overflow springs 1 and 2, contact Y-1, armature Y-2, upper winding of HA, armature HA-2, contact HA-1 to (−). Although the upper winding of HA is in series with the upper winding of relay SW, only SW operates because the resistance of HA is extremely low. Relay SW connects the front sleeve to the back sleeve at its armature SW-2 and contact SW-3; removes ground from the operating circuit for relay RD1 at its armature SW-7; completes the previously prepared circuit for applying 300 ground impulses per minute to the MON lamp; and at its armatures SW-15 and SW-18 and its contacts SW-14 and SW-17, respectively, extends the tip and ring conductors of the incoming line through the tip and ring brushes of the XY switch to relay CB2 at the manual switchboard (see Fig. 3). The circuit for the flashing of lamp MON may be traced from the 300 IPM lead coming from a suitable source of interrupted ground pulses, such as the exchange interrupter, contact YN-5, armature YN-6, contact SW-11, armature SW-12, MON to (−). As previously indicated, CB2 is now energized, the circuit extending from (+), upper winding of CB2, tip contact of the line in the N level of the contact banks of the switch, tip wiper 1 of the XY switch, contact SW-14, armature SW-15, tip side of the incoming line through the preceding circuits to the substation A, ring side of the incoming line through the line circuit and line finder, armature SW-18, contact SW-17, ring wiper 2 of the XY switch, ring contact of the line in the N level of the switch, lower winding of CB2 to (−).

Relay CB2 closes an obvious circuit for the energization of relay RD2, which in turn grounds the front sleeve of the selector at its armature RD2-1 and contact RD2-2, and also lights the answer lamp ANS on the face of the manual switchboard over a circuit extending from (+), armature RD2-6, contact RD2-5, contact HD-5, armature HD-4, listen key springs 7 and 8, lamp ANS to (−). The act of grounding the back sleeve provides a holding ground for the SW relay when the RD1 relay is released.

Upon seeing the answer lamp lighted, the operator at the manual switchboard may operate the listen key to find out whether anyone at substation A is on the line. Simultaneously with the operation of this key to connect the operator's telephone to the talking conductor of the incoming line, the answer lamp circuit is broken at listen key springs 7 and 8, and at listen key contacts 1 and 2 an obvious circuit is completed for energizing relay HD. Relay HD locks over an obvious circuit to the ground provided at contact HD2-2.

If the operator finds out that no one is on the line, she may operate her howler key to connect the howler to the tip and ring conductors of the incoming line. The howler output is usually a voltage which produces a loud rasping sound in the receiver at substation A. Frequently this sound is sufficient to attract the attention of someone in the house or other location of substation A, and lead the person to replace the receiver on the hook.

Lest the operator forget that howler voltage is being applied to one of the incoming lines, relay HD is arranged to complete a circuit for flashing the answer lamp to indicate the status of the call being intercepted. This circuit may be traced from the 60 IPM lead coming from a conventional source of 60 ground impulses per minute, contact HD-3, armature HD-4, listen key springs 7 and 8, and answer lamp ANS to (−).

If the receiver is replaced on the hook at substation A in response to the sound produced by the howler voltage, relay CB2 is released by the opening of the loop connected to the incoming line. Relay CB2 thus releases relay RD2, which in turn removes the holding ground for relay HD to stop the flashing of the ANS lamp, and also removes holding ground from the front sleeve. Removal of this ground results in the release of relay SW. The 300 IPM ground pulses are thus removed from the MON lamp, and a circuit is closed for release magnet Z of the switch. The latter path extends from (+), contact RD1-11, armature RD1-10, armature SW-9, contact SW-10, $Y_{on}$ springs 1 and 2, winding of magnet Z to (−).

Magnet Z energizes the lower winding of relay HA for the reason previously explained, and also restores the wipers of the switch to their normal position. The circuit for energizing magnet Z is broken when the wipers reach their home position because its energizing circuit is broken by the parting of $Y_{on}$ springs 1 and 2. While energized, magnet Z breaks the holding circuit for relay YN at its contact Z-3 and YN thereupon drops back. Under these conditions the circuit is restored to its resting or unactuated condition, ready for another call. The de-energization of magnet Z also releases relay HA, which in turn removes ground from the back sleeve to release the line finder and line circuit.

If the application of howler voltage to the incoming line does not result in correction of the off-hook condition, the operator at the manual switchboard may call a trouble man to ascertain the difficulty. The trouble man can easily locate which selector is occupied with an uncompleted call because lamp MON is flashing at the rate of 300 times per minute. He can therefore find out whether the difficulty lies in the central exchange, at the subscriber's substation, or possibly on the subscriber's line.

While I have shown and described a specific embodiment of my invention, I do not desire my invention to be limited to the particular arrangement herein disclosed, since other modifications will readily occur to those skilled in the art. For example, my invention will work equally well with other rates of ground pulses for the lighting of lamps MON and ANS. Furthermore, it is obvious that my invention could easily be applied to other automatic switching means, or to other types of automatic switches. I therefore intend to cover in the appended claims all modifications within the spirit and scope of my invention.

What I claim is:

1. In a telephone system, a calling party, a called party, an operator, a two-motion switch having a set of wipers movable in first and second directions and having a number of numerical contact levels giving access to said called party after movement of said wipers in the first and second directions and a normal contact level giving access to said operator upon movement of said wipers in the second direction without movement in the first direction, numerical pulse transmitting means controlled by said calling party, timing means, means associated with said switch and effective upon seizure of said switch and receipt of numerical pulses from said pulse transmitting means to cause said wipers to be moved in the first and second directions and set upon circuits in said numerical levels for establishing connection between said calling party and said called party, means operative to cause said wipers to be moved in the second direction only to cut in on said normal level and establish a connection between said calling party and said operator, and means associated with said last named means and said timing means for causing said last named means to be operated by said timing means if no numerical pulses have been received within a predetermined time after seizure of said switch.

2. In a telephone system, a calling party, a two-motion switch having a set of wipers movable in first and second directions and having a number of numerical contact levels giving access to a first class of lines after movement of said wipers in the first and second directions and a normal contact level giving access to a line of a second class upon movement of said wipers in the second direction without movement in the first direction, numerical pulse transmitting means controlled by said calling party, timing means, means associated with said switch and effective upon seizure of said switch and receipt of numerical pulses from said pulse transmitting means to cause said wipers to be moved in the first and second directions and set upon circuits in said numerical levels for establishing connection between said calling party and a line of said first class of lines, means operative to cause said wipers to be moved in the second direction only and cut in on said normal level for establishing a connection between said calling party and a line of said second class, and means associated with said last named means and said timing means for causing said last named means to be operated by said timing means if no numerical pulses have been received within a predetermined time after seizure of said switch.

3. In a telephone system, a calling party, a called party, an operator, a two-motion switch having a set of wipers movable in first and second directions and having a number of numerical contact levels giving access to said called party after movement of said wipers in the first and second directions and a normal contact level giving access to said operator upon movement of said wipers in the second direction without movement in the first direction, numerical pulse transmitting means controlled by said calling party, timing means, said timing means including a first timing circuit adapted to be closed after seizure of said switch, said timing means also including a second timing circuit established by closure of said first timing circuit and adapted to be opened a predetermined time after closure of said first timing circuit, means associated with said switch and effective upon seizure of said switch and receipt of numerical pulses from said pulse transmitting means prior to the opening of said second timing circuit to cause said wipers to be moved in the first and second directions and set upon circuits in said numerical levels for establishing connection between said calling party and said called party, means operative to cause said wipers to be moved in the second direction only and cut in on said normal level for establishing a connection between said calling party and said operator, and means associated with said last named means and said timing means for causing said last named means to be operated in response to the opening of said second timing circuit if no numerical pulses have been received prior to the opening of said second timing circuit.

4. In a telephone system, a calling party, a two-motion switch having a set of wipers movable in first and second directions and having a number of numerical contact levels giving access to a first class of lines after movement of said wipers in the first and second directions and a normal contact level giving access to a line of a second class upon movement of said wipers in the second direction without movement in the first direction, numerical pulse transmitting means controlled by said calling party, timing means, said timing means including a first timing circuit adapted to be closed after seizure of said switch, said timing means also including a second timing circuit established by closure of said first timing circuit and adapted to be opened a predetermined time after closure of said first timing circuit, means associated with said switch and effective upon seizure of said switch and receipt of numerical pulses from said pulse transmitting means prior to the opening of said second timing circuit to cause said wipers to be moved in the first and second directions and set upon circuits in said numerical levels for establishing connection between said calling party and a line of said first class of lines, means operative to cause said wipers to be moved in the second direction only and cut in on said normal level for establishing a connection between said calling party and a line of said second class, and means associated with said last named means and said timing means for causing said last named means to be operated in response to the opening of said second timing circuit if no numerical pulses have been received prior to the opening of said second timing circuit.

5. In a telephone system, a calling party, numerical pulse transmitting means controlled by said calling party, a two-motion stepping switch having a bank of contacts disposed in a number of levels including a normal level, a set of wipers for selectively engaging said contacts, a first magnet for moving said wipers in a first level selecting direction, a second magnet for moving said wipers in a second direction into a level, said switch having associated therewith a change-over relay effective upon operation in an initial circuit closed incident to the seizure of said switch to connect said first magnet into a circuit controlled by said numerical pulses and effective upon release to disconnect said first magnet and connect said second magnet into an automatic pulsing circuit, a first holding circuit for maintaining operated said change-over relay during movement of said switch in said first level selecting direction, means for opening said first holding circuit and causing said change-over relay to release responsive to the termination of a series of numerical pulses to thereby cause said second magnet to automatically move said wipers in the second direction into engagement with contacts in a level other than said normal level, timing means, a second holding circuit for maintaining operated said change-over relay, means controlled by said timing means for transferring said change-over relay from said first holding circuit to said second holding circuit after seizure of said switch, and means controlled by said timing means to open said second holding circuit and restore said change-over relay if no numerical pulses have been received within a predetermined time after said change-over relay has been transferred to said second holding circuit to thereby cause said second magnet to automatically move said wipers in the second direction into engagement with said contacts in said normal level without previously moving said wipers in the first level selecting direction.

6. In a telephone system, a calling part, numerical pulse transmitting means controlled by said calling party, a two-motion stepping switch having a bank of contacts disposed in a number of levels including a normal level, a set of wipers for selectively engaging said contacts, a first magnet for moving said wipers in a first level selecting direction, a second magnet for moving said wipers in a second direction into a level, said switch having associated therewith a change-over relay effective upon operation in an initial circuit closed incident to the seizure of said switch to connect said first magnet into a circuit controlled by said numerical pulses and effective upon release to disconnect said first magnet and connect said second magnet into an automatic pulsing circuit, a first holding circuit for maintaining operated said change-over relay during movement of said switch in said first level selecting direction, means for opening said first holding circuit and causing said change-over relay to release responsive to the termination of a series of numerical pulses to thereby cause said second magnet to automatically move said wipers in the second direction into engagement with contacts in a level other than said normal level, timing means, said timing means including a first timing circuit adapted to be closed after seizure of said switch, said timing means also including a second timing circuit established by closure of said first timing circuit and adapted to be opened a predetermined time after closure of said first timing circuit, a second holding circuit for maintaining operated said change-over relay, means controlled by closure of said first timing circuit for transferring said change-over relay from said first holding circuit to said second holding circuit after seizure of said switch, and means controlled by opening of said second timing circuit to open said second holding circuit and restore said change-over relay if no numerical pulses have been received within a predetermined time after said change-over relay has been transferred to said second holding circuit to thereby cause said second magnet to automatically move said wipers in the second direction into engagement with said contacts in said normal level without previously moving said wipers in the first level selecting direction.

FRANK KESSLER.

References Cited in the file of this patent

UNITED STATES PATENTS

| Number | Name | Date |
|---|---|---|
| 1,541,386 | Polinkowsky | June 9, 1925 |
| 1,896,757 | Strickler | Feb. 7, 1933 |
| 2,010,365 | Hoefert et al. | Aug. 6, 1935 |
| 2,143,971 | Brazelton | Jan. 17, 1939 |
| 2,183,649 | Kahn | Dec. 19, 1939 |
| 2,261,243 | Flint | Nov. 4, 1941 |
| 2,504,708 | Long | Apr. 18, 1950 |
| 2,567,650 | Morris | Sept. 11, 1951 |